United States Patent
Wu et al.

(10) Patent No.: US 8,604,394 B2
(45) Date of Patent: Dec. 10, 2013

(54) GRILLING DEVICE

(75) Inventors: Chunyu Wu, Fujian Province (CN);
Jingliang Yu, Fujian Province (CN)

(73) Assignee: Tsann Kuen (Zhangzhou) Enterprise Co., Ltd., Zhangzhou (CN)

(*) Notice: Subject to any disclaimer, the term of this patent is extended or adjusted under 35 U.S.C. 154(b) by 417 days.

(21) Appl. No.: 12/780,288

(22) Filed: May 14, 2010

(65) Prior Publication Data
US 2010/0288749 A1    Nov. 18, 2010

(30) Foreign Application Priority Data

May 14, 2009   (CN) .................... 2009 2 0138421 U

(51) Int. Cl.
*H05B 3/68*    (2006.01)
*F24C 13/00*    (2006.01)

(52) U.S. Cl.
USPC ............................................. 219/450.1; 126/5

(58) Field of Classification Search
USPC ............................................. 219/450.1; 126/5
See application file for complete search history.

(56) References Cited

U.S. PATENT DOCUMENTS

| | | | | |
|---|---|---|---|---|
| 5,680,810 | A | * | 10/1997 | Sham .............................. 99/330 |
| 6,257,227 | B1 | * | 7/2001 | Harbin ............................. 126/5 |
| 6,431,164 | B1 | * | 8/2002 | Wardell ............................ 126/5 |
| 6,530,308 | B1 | * | 3/2003 | Lin .................................. 99/330 |
| 7,220,365 | B2 | * | 5/2007 | Qu et al. .......................... 252/70 |
| 7,274,003 | B2 | * | 9/2007 | Baumann ....................... 219/401 |
| 8,006,684 | B2 | * | 8/2011 | Lee et al. ......................... 126/20 |
| 2009/0212045 | A1 | * | 8/2009 | Zhang et al. ................... 219/682 |
| 2012/0237647 | A1 | * | 9/2012 | Dobert et al. ................. 426/243 |

FOREIGN PATENT DOCUMENTS

| CN | 2815212 Y | 9/2006 |
|---|---|---|
| CN | 1860972 A | 11/2006 |

* cited by examiner

*Primary Examiner* — Colleen Matthews
(74) *Attorney, Agent, or Firm* — Rabin & Berdo, P.C.

(57) ABSTRACT

The present invention relates to a grilling device, especially relates to a steam grilling device. It comprises a main body and a steam generator disposed on the main body. Compared to the conventional technique, by adding a steam generator on the main body of grilling device, the grilling device will has not only a general grilling function, but also has the steam heating function, so the heating of the grilling device will speed up, the loss of the nutrition of the food will be eliminated, and it also has effects such as degreasing and freshen, so the cooked food will be more nutritious and healthy.

7 Claims, 4 Drawing Sheets

GRILLING DEVICE

FIELD OF THE INVENTION

The present invention relates to a grilling device.

BACKGROUND OF THE INVENTION

The function of the grilling device of the conventional technique is usually single, it only can used for roast, there are also some cooking devices which has the function of both steam and roast, but most of the steam function applies ordinary steam, so the heating speed is relatively low, the heating effect by steam is not good. Chinese publication NO.CN1860972A discloses a cooking device which can used for both steam and roast, it has two heating manners including steam heating and grill heating; and Chinese publication NO.CN2815212Y discloses an electric steaming oven which has roasting function, it comprises a cooking inner chamber disposed in the oven\ a steam generator and a controlling circuit, an electric heating element for roasting is disposed in the housing; such cooking devices and so on are within the scope of the above devices.

SUMMARY OF THE INVENTION

The main objective of the present invention is to overcome the shortages of the single heating function of the conventional grilling device, and to provide a grilling device which also has the function of steam heating.

The technical solution applied by the present invention is:

A grilling device, comprising a main body and a steam generator disposed on the main body of grilling device.

According to a preferred embodiment of the present invention, said steam generator comprises a pump\ a first water pipe\ a heating element\ an electric heating tube\ a steam pipe and a fixed mask; wherein said pump has a water inlet which is connected with a water supply and a water outlet which is connected with said heating element by said first water pipe; wherein one end of said steam pipe communicates with said heating element, and the other end is a steam outlet which extends into an cooking chamber of said main body; wherein said fixed mask mounts said steam pipe and said electric heating tube together.

According to a preferred embodiment of the present invention, said steam outlet is disposed on the top of said main body, and said outlet faces downwardly.

According to a preferred embodiment of the present invention, said water supply is a water tank which is integrated with said main body; wherein said water tank in connected with said water inlet by a second water pipe.

According to a preferred embodiment of the present invention, said water supply is communicated with an external water supply by said second water pipe.

According to a preferred embodiment of the present invention, said heating element comprises a steam generating chamber disposed with a water inlet, a steam outlet and an electric heating tube or an electric heating wire; wherein said water inlet communicates with said first water pipe, and said steam outlet communicates with said steam pipe.

According to a preferred embodiment of the present invention, said main body of comprises an upper part, a lower part and a middle part; wherein the middle part and the upper part are mounted together and form a space for clamping the steam generator, a steam through hole is disposed on the middle part.

Referred from the description of the present invention, compared to the conventional technique, the grilling device of present invention has below advantages:

Firstly, by adding a steam generator on the main body, the grilling device will not only has grill function, but also has steam heating function, so the heating speed of the grilling device is quick\ the loss of nutrition of food will be eliminated\ degreasing and freshen and so on, so the cooked food will be more nutritious and healthy, the chance of diseases caused by obesity will be reduced;

Secondly, the steam outlet is disposed on the top of the main body of grilling device, so the steam will spurt vertically and downwardly, the heating of food will speed up, the effect of degreasing and freshen is more efficient;

Thirdly, since the present invention has the steam heating function, so the cooking speed of food is quicker, on the one hand the cooking time will be saved, on the other the energy consumption will be reduced and helpful for environmental protection;

Fourthly, the present invention applies a fixed mask to mount the steam pipe and electric heating tube together, so the ordinary steam will be sufficiently processed twice by the electric heating tube, thereby the steam with sufficient high temperature will be generated.

DETAILED DESCRIPTION OF THE EMBODIMENTS

The present invention will become apparent upon the reference of detailed description of the embodiments.

Figure 1:
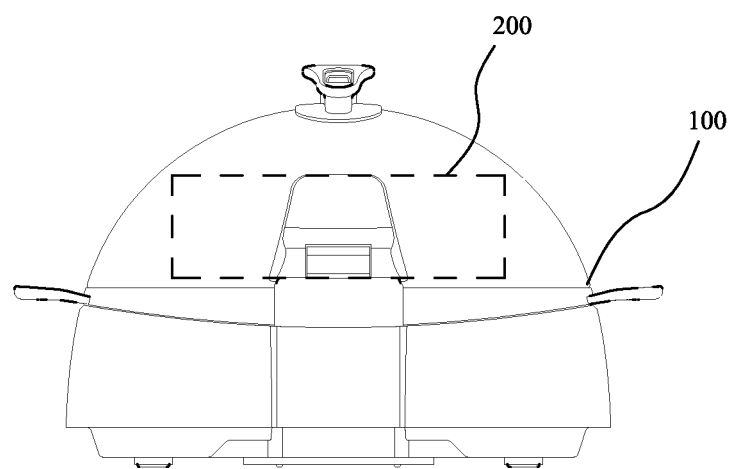
FIG. 1 is the whole structural view of grilling device of the present invention.
Figure 2:
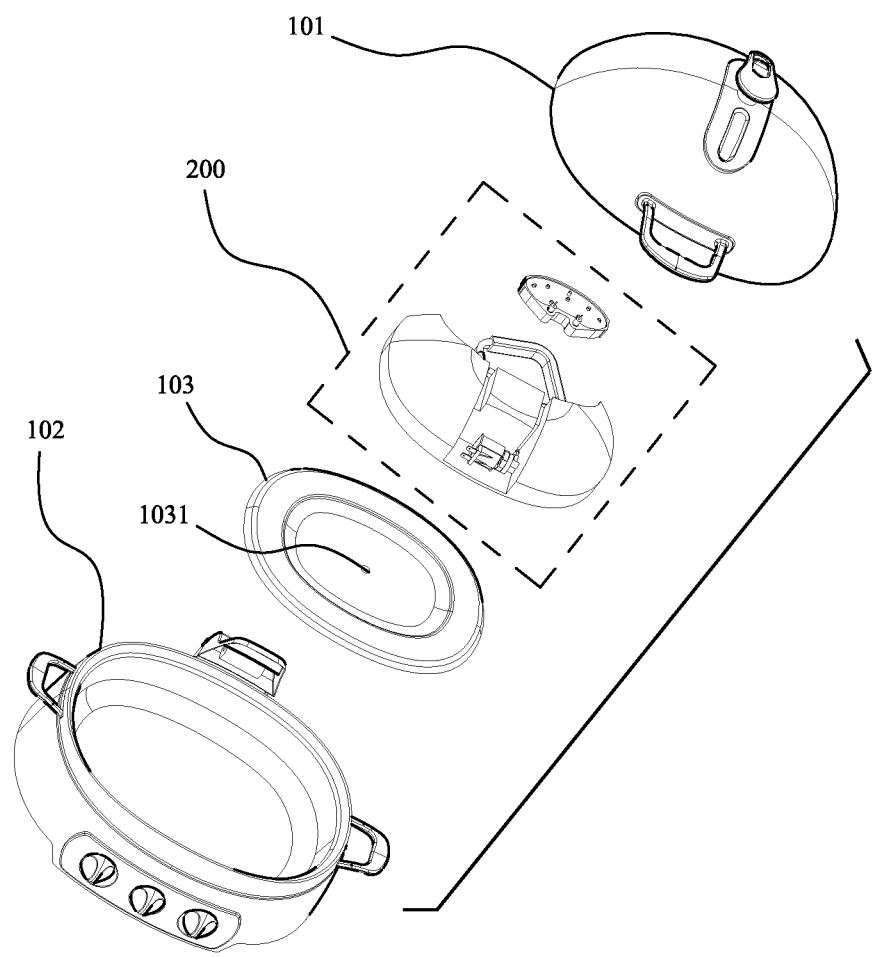
FIG. 2 is the exploded structural view of grilling device of the present invention.

Please refer to FIG. 1 and FIG. 2, a grilling device of the present invention, comprising a main body 100 and a steam generator 200 disposed on the top of said main body 100.

The main body 100 of grilling device comprises an upper part 101\ a lower part 102 and a middle part 103, the middle part 103 and the upper part 101 are mounted together and form a space for clamping the steam generator 200, a grilling plate is disposed in the lower part 101, the bottom surface of middle part 103 can be also disposed with grilling plate according to practical need, further, a steam through hole 1031 is disposed on the top of middle part 103 for the spurting the steam generated by the steam generator 200.

said steam generator comprises a pump\ a first water pipe\ a heating element\ an electric heating tube\ a steam pipe and a fixed mask; wherein said pump has a water inlet which is connected with a water supply and a water outlet which is connected with said heating element by said first water pipe; wherein one end of said steam pipe communicates with said heating element, and the other end is a steam outlet which extends into an cooking chamber of said main body; wherein said fixed mask mounts said steam pipe and said electric heating tube together.

Figure 3:
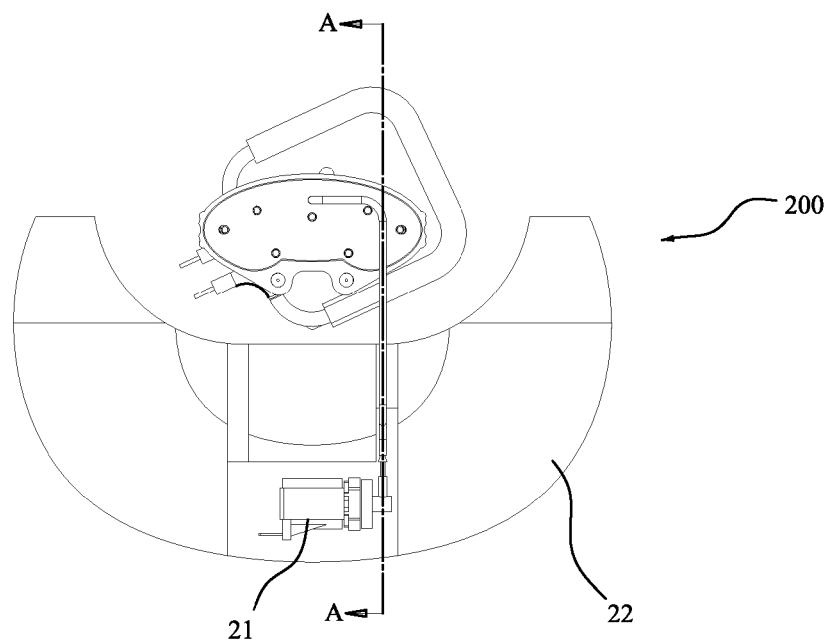
FIG. 3 is the whole structural view of generator of steam grilling device of the present invention.
Figure 4:
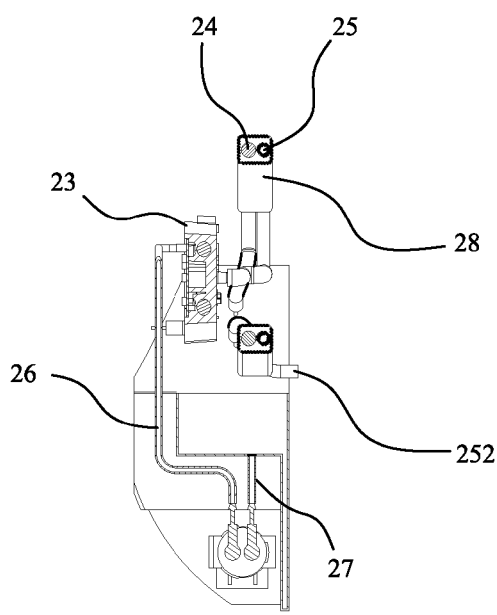
FIG. 4 is the sectional view of A-A direction of FIG. 3.
Figure 5:
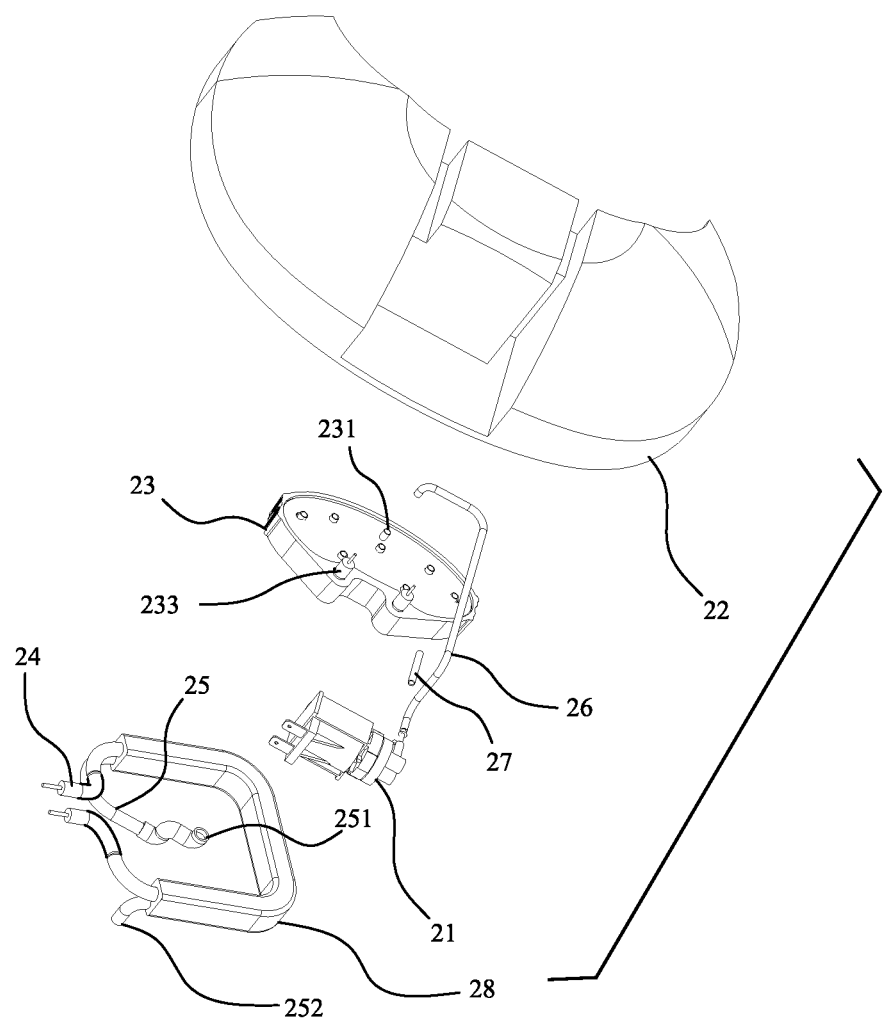
FIG. 5 is the exploded structural view of steam generator of grilling device of the present invention.

Please refer to FIG. 3\ FIG. 4 and FIG. 5, the steam generator 200 comprises a pump 21, a water tank 22, a heating element 23, an electric heating tube 24, a steam pipe 25, a first water pipe 26, a second water pipe 27 and a fixed mask 28, said pump 21 communicates with the water tank 22 by the second water pipe 27, and communicates with inlet 231 of heating element 23 by first water pipe 26, the heating element 23 is embedded with an electric heating tube 233, and it communicates with the ordinary steam inlet 251 of an end of steam pipe 25 by the steam outlet on it, another end of steam pipe 25 is steam outlet 252; the steam pipe 25 and the electric heating tube 24 are mounted together by the fixed mask 28, so the electric heating tube 24 can sufficiently heat the ordinary steam twice, so the steam with sufficient high temperature will be generated.

When the steam grilling device of the present invention is operated, the pump extracts water from the water tank 22 by the second water pipe 27, then the water is extracted into the heating element 23 by the first water pipe 26, the water in the heating element 23 will be vaporized into ordinary steam, said ordinary steam will enter the steam pipe 25 by the ordinary steam inlet 251, after the reheating by the electric heating tube 24 in the steam pipe 25, the ordinary steam is heated to form the steam with sufficient high temperature, the generated steam with relative high temperature will spurt out of the steam outlet 252, so the food will be heated by steam. In the present invention, the steam outlet is disposed vertically and downwardly, so the steam will vertically and downwardly spurt from the steam through hole 1031.

The present invention adds steam generator on the ordinary grilling device, on one hand, the flavor of the grilled food will not disappear, on the other hand, the food can be quickly heated by the steam, so it will greatly eliminate the loss of the nutrition of food, and it also has the effects as degreasing and freshen, it will make best of the combination of grill heating and steam heating, the cooked food will be more nutritious and healthy.

Although the present invention has been described with reference to the preferred embodiments thereof for carrying out the invention, it is apparent to those skilled in the art that a variety of modifications and changes may be made without departing from the scope of the present invention which is intended to be defined by the appended claims.

What is claimed is:

1. A grilling device, comprising:
   a main body;
   a steam generator disposed on the main body;
   a steam pipe, steam being disposed in the steam pipe;
   a fixed mask; and
   an electric heating tube;
   wherein said fixed mask is configured to mount said steam pipe and said electric heating tube together;
   wherein said fixed mask, said steam pipe, and said electric heating tube are configured to increase a temperature of steam in the steam pipe to cook food quickly, and a decrease of the temperature of steam in the process of transmission being substantially prevented; and
   wherein said electric heating tube is configured to increase the temperature of steam from said steam generator.

2. The grilling device according to claim 1, further comprising:
   a pump;
   a first water pipe; and
   a heating element;
   wherein said pump has a water inlet which is connected with a water supply and a water outlet which is connected with said heating element by said first water pipe;
   wherein one end of said steam pipe communicates with said heating element, and the other end is a steam outlet which extends into a cooking chamber of said main body; and
   wherein said fixed mask mounts said steam pipe and said electric heating tube together.

3. The grilling device according to claim 2, wherein said steam outlet is disposed on the top of said main body, and said outlet faces downwardly.

4. The grilling device according to claim 2, wherein said water supply is a water tank which is integrated with said main body; wherein said water tank is connected with said water inlet by a second water pipe.

5. The grilling device according to claim 2, wherein said water supply is communicated with an external water supply by a second water pipe.

6. The grilling device according to claim 2, wherein:
   said heating element comprises a steam generating chamber disposed with the water inlet, the steam outlet and the electric heating tube or an electric heating wire; and
   said water inlet communicates with said first water pipe, and said steam outlet communicates with said steam pipe.

7. The grilling device according to claim 1, wherein:
   said main body comprises an upper part, a lower part and a middle part; and
   the middle part and the upper part are mounted together and form a space for clamping the steam generator, a steam through hole being disposed on the middle part.

* * * * *